(12) United States Patent
Kouzai et al.

(10) Patent No.: US 7,424,206 B2
(45) Date of Patent: Sep. 9, 2008

(54) RECORDING APPARATUS AND METHOD

(75) Inventors: Toshinori Kouzai, Kanagawa (JP); Kenji Nikata, Kanagawa (JP); Yoichiro Tauchi, Saitama (JP); Hidehiko Teshirogi, Kanagawa (JP)

(73) Assignee: Sony Corporation, Tokyo (JP)

( * ) Notice: Subject to any disclaimer, the term of this patent is extended or adjusted under 35 U.S.C. 154(b) by 651 days.

(21) Appl. No.: 10/516,707

(22) PCT Filed: Mar. 17, 2004

(86) PCT No.: PCT/JP2004/003553

§ 371 (c)(1),
(2), (4) Date: Dec. 2, 2004

(87) PCT Pub. No.: WO2004/091206

PCT Pub. Date: Oct. 21, 2004

(65) Prior Publication Data

US 2006/0127065 A1 Jun. 15, 2006

(30) Foreign Application Priority Data

Apr. 4, 2003 (JP) ............................. P2003-102353

(51) Int. Cl.
*H04N 5/91* (2006.01)
(52) U.S. Cl. ......................................... 386/123; 386/69
(58) Field of Classification Search .................. 386/46, 386/95, 69, 123
See application file for complete search history.

(56) References Cited

U.S. PATENT DOCUMENTS

2001/0055473 A1 * 12/2001 Tauchi et al. .................. 386/95

FOREIGN PATENT DOCUMENTS

| JP | 8-124309 | 5/1996 |
|---|---|---|
| JP | 2001-273709 | 10/2001 |
| JP | 2002-77792 | 3/2002 |
| JP | 2002-343032 | 11/2002 |
| JP | 2002-354421 | 12/2002 |
| JP | 2003-9073 | 1/2003 |

* cited by examiner

*Primary Examiner*—Thai Tran
*Assistant Examiner*—Hung Q Dang
(74) *Attorney, Agent, or Firm*—Frommer Lawrence & Haug LLP; William S. Frommer; Ellen Marcie Emas (57) ABSTRACT

A recording apparatus of the present invention comprises a compressed data processing unit for performing compression processing of second definition data to generate compressed data, a system data generating unit for generating system data including at least time code, an extended track number generating unit for generating extended track number on the basis of inputted second definition data, a memory unit for storing compressed data and system data, a read-out unit for reading out compressed data and system data which are stored in the memory unit, a control unit for controlling the read-out unit so as to read out, at a predetermined timing, the compressed data and the system data which are stored in the memory unit on the basis of the extended track number, and a recording unit for recording, into second sector, compressed data which has been read out from the read-out unit, and for recording, into third sector, along with extended track number, system data which has been read out by the read-out unit.

5 Claims, 10 Drawing Sheets

| b12 | b13 | b14 | b15 | b16 | b17 | b22 | b23 | b24 | b25 | b26 | b27 |
|---|---|---|---|---|---|---|---|---|---|---|---|
| $APT_2$ | $APT_2$ | $APT_1$ | $APT_1$ | $APT_0$ | $APT_0$ | $TP_1$ | $TP_1$ | $TP_0$ | $TP_0$ | PF | PF |
| 0 | 0 | 1 | 1 | 0 | 0 | 1 | 1 | 1 | 1 | 0 | 0 |

| | ONE Frame (10track) | | | | | | | | | |
|---|---|---|---|---|---|---|---|---|---|---|
| Track No. | 0 | 1 | 2 | 3 | 4 | 5 | 6 | 7 | 8 | 9 |
| Subcode Data | First Track data | | | | | Second Track data | | | | |

(B)

| | ONE Frame (12track) | | | | | | | | | | | |
|---|---|---|---|---|---|---|---|---|---|---|---|---|
| Track No. | 0 | 1 | 2 | 3 | 4 | 5 | 6 | 7 | 8 | 9 | 10 | 11 |
| Subcode Data | First Track data | | | | | | Second Track data | | | | | |

FIG. 8

| First Track Data | | | | | |
|---|---|---|---|---|---|
| SB No. | DATA area Byte Position Number | | | | |
| | D0 | D1 | D2 | D3 | D4 |
| 0 | ETN | | | | |
| 1 | ETN or TGB | | | | |
| 2 | ETN | | | | |
| 3 | | | TTC | | |
| 4 | | | TTC or TBG or NOI | | |
| 5 | | | TTC | | |
| 6 | ETN | | | | |
| 7 | ETN or TGB | | | | |
| 8 | ETN | | | | |
| 9 | | | TTC | | |
| 10 | | | TTC or TBG or NOI | | |
| 11 | | | TTC | | |

FIG. 9A

| Second Track Data | | | | | |
|---|---|---|---|---|---|
| SB No. | DATA area Byte Position Number | | | | |
| | D0 | D1 | D2 | D3 | D4 |
| 0 | ETN | | | | |
| 1 | ETN | | | | |
| 2 | ETN | | | | |
| 3 | | | TTC | | |
| 4 | | | VRD or ARD or NOI | | |
| 5 | | | VRD or ARD or NOI | | |
| 6 | ETN | | | | |
| 7 | ETN | | | | |
| 8 | ETN | | | | |
| 9 | | | TTC | | |
| 10 | | | VRD or ARD or NOI | | |
| 11 | | | VRD or ARD or NOI | | |

RECORDING APPARATUS AND METHOD

TECHNICAL FIELD

The present invention relates to a magnetic tape recording apparatus adapted to have ability to record high definition video data onto a magnetic tape.

Further, this Application claims priority of Japanese Patent Application No. 2003-102353, filed on Apr. 4, 2003, the entirety of which is incorporated by reference herein.

BACKGROUND ART

In recent years, compression technology is developed, and video data, etc. have been also compressed by, e.g., DV (Digital Video) system so that data thus compressed are recorded onto a magnetic tape. Format therefor is prescribed as DV format of consumer digital video tape recorders.

Figure 1:
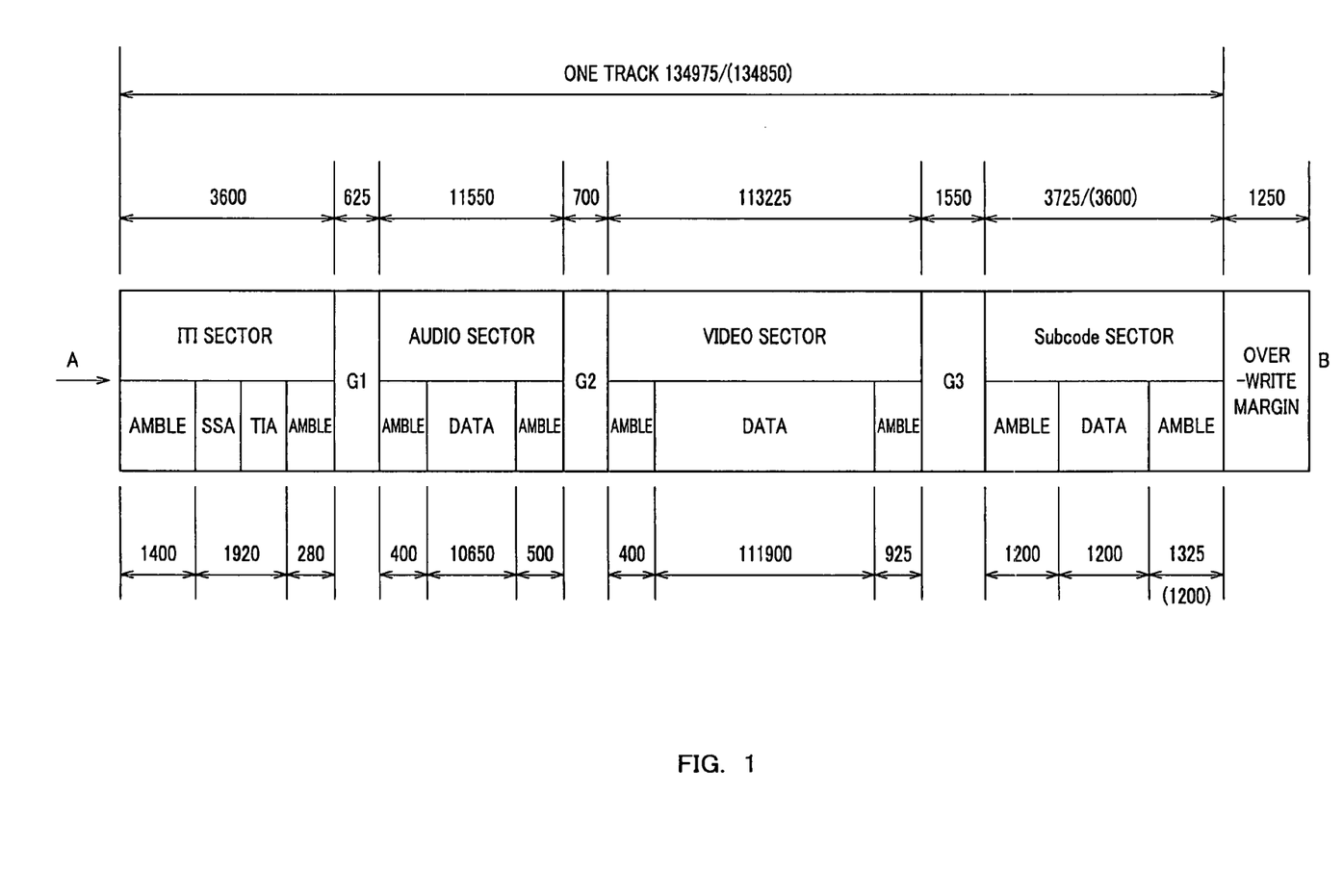
FIG. 1 is a view showing sector arrangement within track of DV format.

FIG. 1 shows the configuration of one track of a conventional DV format. In the DV format, video data are recorded after they have been 24-25 converted. In this case, the numbers of bits of figures shown in FIG. 1 represent numeric values after 24-25 conversion has been performed.

The range corresponding to winding angle of 174 degrees of magnetic tape is caused to be range of substantial one track. At the outside of the range of one track, overwrite margin having length of 1250 bits is formed. The overwrite margin serves to eliminate erasing remainder of data.

In the case where the rotary head is rotated in synchronism with frequency of 60×1000/1001 Hz (hereinafter referred to as 60 Hz), length of the range of one track is caused to be 134975 bits. In the case where the rotary head is rotated in synchronism with frequency of 50×1000/1001 Hz (hereinafter referred to as 50 Hz), the length of the range of one track is caused to be 134850 bits.

At one track, in the trace direction of the rotary head (from left direction to right direction in FIG. 1), ITI (Insert and Track Information) sector, audio sector, video sector and Subcode sector are arranged (assigned) in succession. Between the ITI sector and the audio sector, gap G1 is formed. Between the audio sector and the video sector, gap G2 is formed. In addition, between the video sector and the Subcode sector, gap G3 is formed.

The ITI sector is caused to have length of 3600 bits, and preamble of 1400 bits for generating clock is disposed (assigned) at the leading portion thereof. At the portion succeeding thereto, SSA (Start Sync Area) and TIA (Track Information Area) are provided by length corresponding to 1920 bits. At the SSA, bit train (Sync No.) necessary for detecting the position of TIA is disposed (assigned). At the TIA, there are recorded information indicating consumer DV format, information indicating SP recording mode or LP recording mode, and information indicating pattern of pilot signal of one frame, etc. At the portion succeeding to the TIA, postamble of 280 bits is disposed (assigned).

The gap G1 is caused to have length of 625 bits. The audio sector is caused to have length of 11550 bits, and the leading 400 bits and the last 500 bits are caused to be respectively preamble and postamble, wherein 10650 bits therebetween is caused to be data (audio data). The gap G2 is caused to have length of 700 bits.

The video sector is caused to have length of 113225 bits, and the leading 400 bits and the last 925 bits are respectively preamble and postamble, wherein 111900 bits therebetween is caused to be data (video data). The gap G3 is caused to have length of 1550 bits.

When the rotary head is rotated in synchronism with frequency of 60 Hz, the Subcode sector is caused to have length of 3725 bits. When the rotary head is rotated in synchronism with frequency of 50 Hz, the Subcode sector is caused to have length of 3600 bits. The leading 1200 bits thereof is caused to be preamble, and the last 1325 bits (at the time of 60 Hz) or the last 1200 bits (at the time of 50 Hz) is caused to be postamble, wherein 1200 bits therebetween is caused to be data (subcode).

In the DV format, there was the problem that not only gaps G1 to G3 are formed between the ITI sector, the audio sector, the video sector, and the Subcode sector, but also preambles and postambles are provided are provided every respective sectors as stated above so that the so-called overhead is long thus to fail to sufficiently ensure recording rate of substantial data.

As a result, in the case where, e.g., High Definition video data (hereinafter referred to as HD video data) is recorded, bit rate of about 25 Mbps is required. However, in this recording format, only about 24 Mbps is required at the utmost as video rate with respect to MP@HL of the MPEG (Moving Picture Expert Group) except for data for search image. As a result, there was the problem that even if recording of Standard Definition video data (hereinafter referred to as SD video data) can be performed, it is impossible to compress HD video data by the MP@HL system or the MP@H-14 system, etc. to record such compressed video data.

In order to cope with the above-mentioned problem, in the DV format, ATV recording format (Specifications of Consumer-Use Digital VCRs, PART8 (ATV Specifications of Consumer-Use Digital VCR) and Specifications of Consumer-Use Digital VCRs, PART7 (DVB Specifications of Consumer-Use Digital VCR)) is defined in order to record HD video data. However, in the case where the recording format is in conformity with the DV format, only about 18.7 Mbps in total can be recorded as ES (Elementary Stream), and it was therefore necessary to separately define recording format in order to obtain higher picture quality and/or higher sound quality.

Moreover, there is a technology in which in the case where data which is in conformity with the DV format (SD data) and data which is not in conformity with the DV format HD format (HD data) are recorded in a mixed state, values of APT (Application ID of a track) of ITI of SD data and HD data are set to different values in order to recognize respective data. In this case, value of APT of ITI of SD data is value "000" indicating that the recording format is in conformity with the DV format.

However, when value of APT is set to value indicating that the recording format is not in conformity with the DV format (e.g., "010"), recording state would be recognized as Reserved state (unrecognizable recording is performed) in consumer digital video tape recorders which comply with only the DV format, the same behavior as that when non-recorded tape reproduced is performed with respect to user may be performed. As a result, there is the problem that previously recorded data might be erroneously erased, or might be overwrite-recorded by other data.

DISCLOSURE OF THE INVENTION

An object of the present invention is to provide a recording apparatus and a recording method which are adapted for recording HD data onto a magnetic tape in conformity with the DV format in order to have ability to record that data which is not in conformity with the DV format (HD data) is recorded in a reproducing apparatus which only complies with DV format.

The recording apparatus according to the present invention is directed to a recording apparatus adapted for recording first definition data in accordance with a first format, and for recording data having a definition different from the first definition data (hereinafter referred to as second definition data) in accordance with a second format different from the first format onto a magnetic tape in which plural tracks each consisting of first sector, second sector and third sector are formed in conformity with the first format, the recording apparatus comprising: compressed data processing means for performing compression processing of inputted second definition data to generate compressed data; system data generating means for generating system data including at least time code; time management information generating means for detecting time information from the inputted second definition data to generate time management information on the basis of the time information; extended track number generating means for generating extended track number on the basis of the time management information; memory means for storing the compressed data and the system data; read-out means for reading out compressed data and system data which are stored in the memory means; control means for controlling the read-out means so as to read out, at a predetermined timing, the compressed data and the system data which are stored in the memory means on the basis of the extended track number; and recording means for recording, into the second sector, the compressed data which has been read out by the read-out means, and for recording, into the third sector, along with extended track number, the system data which has been read out by the read-out means, wherein the recording means records, at a predetermined position of the first sector, format information indicating that compressed data is recorded in the second sector in accordance with the second format, and records, at a predetermined position of the third sector (position in which format information indicating the first format is recorded in the case where data is recorded in accordance with the first format (position from the leading address of the first sector)), format information indicating the first format.

The recording method according to the present invention is directed to a recording method of recording first definition data in accordance with a first format, and of recording data having a definition different from the first definition data (hereinafter referred to as second definition data) in accordance with a second format different from the first format onto a magnetic tape in which plural tracks each consisting of first sector, second sector and third sector are formed in conformity with the first format, the recording method including: a compressed data generation step of performing compression processing of inputted second definition data to generate compressed data; a system data generation step of generating system data including at least time code; a time management information generation step of detecting time information from inputted second definition data to generate time management information on the basis of the time information; an extended track number generation step of generating extended track number on the basis of the time management information; a memory step of storing the compressed data and the system data into a memory unit; a read-out step of reading out, at a predetermined timing, compressed data and system data from the memory unit on the basis of the extended track number; and a recording step of recording, into the second sector, compressed data which has been read out by the read-out step, and of recording, into the third sector, along with extended track number, the system data which has been read out by the read-out step, wherein the recording step comprises: recording, at a predetermined position of the first sector, format information indicating that compressed data is recorded in the second sector in accordance with the second format, and recording, at a predetermined position of the third sector (position in which format information indicating the first format is recorded in the state where data is recorded in accordance with the first format (position from the leading address of the first sector)), format information indicating the first format.

Still further objects of the present invention and practical merits obtained by the present invention will become more apparent from the description of the embodiments which will be given below.

BEST MODE FOR CARRYING OUT THE INVENTION

Embodiments of the present invention will be described in detail below by suitably making reference to the attached drawings.

In the recording/reproducing apparatus according to the embodiments of the present invention, magnetic tape traveling system which is substantially the same as that of DV (Digital Video) system (format) is used to record predetermined data onto a magnetic tape.

Here, the sector arrangement within one track of the DV format will be explained below by using FIG. 1. One track consists in trace direction of the rotary head (from A to B in FIG. 1), of ITI of 3600 bits, GAP1 of 625 bits, Audio sector of 11550 bits, GAP2 of 700 bits, Video sector of 113225 bits, GAP3 of 1550 bits, Subcode sector of 3725 bits in the case where the rotary head is rotated in synchronism with frequency of 60×1000/1001 Hz (hereinafter referred to as 60 Hz), or 3600 bits in the case where the rotary head is rotated in synchronism with frequency of 50×1000/1001 Hz (hereinafter refereed to as 50 Hz), and overwrite margin of 1250 bits. The number of effective bits of one track is equal to 134975 bits in the case of 60 Hz, and is equal to 134850 bits in the case of 50 Hz within the range from the leading address of the ITI sector up to the last address of the Subcode sector. It is to be noted that, in FIG. 1, the numeric value of the number of effective bits of one track at the time of 60 Hz is indicated, and the numeric value corresponding thereto at the time of 50 Hz is indicated in a parenthetic form.

Here, the sector arrangement within one track of the format according to the present invention will be explained below by using FIG. 2. One track consists, in trace direction of the rotary head (from A to B in FIG. 2), of ITI sector of 3600 bits, Main sector of 128575 bits, Subcode sector of 2800 bits in the case where the rotary head is rotated in synchronism with frequency of 60 Hz, or 2675 bits in the case where the rotary head is rotated in synchronism with frequency of 50 Hz, and overwrite margin of 1250 bits. The number of effective bits of one track is equal to 134975 bits in the case of 60 Hz, and is equal to 134850 bits in the case of 50 Hz within the range from the leading address of the ITI sector to the last address of Subcode sector, and is the same as that of the DV format. It is to be noted that, in FIG. 2, the numeric value of the number of effective bits of one track at the time of 60 Hz is indicated, and the numeric value corresponding thereto at the time of 50 Hz is indicated in a parenthetic form.

Figure 3:
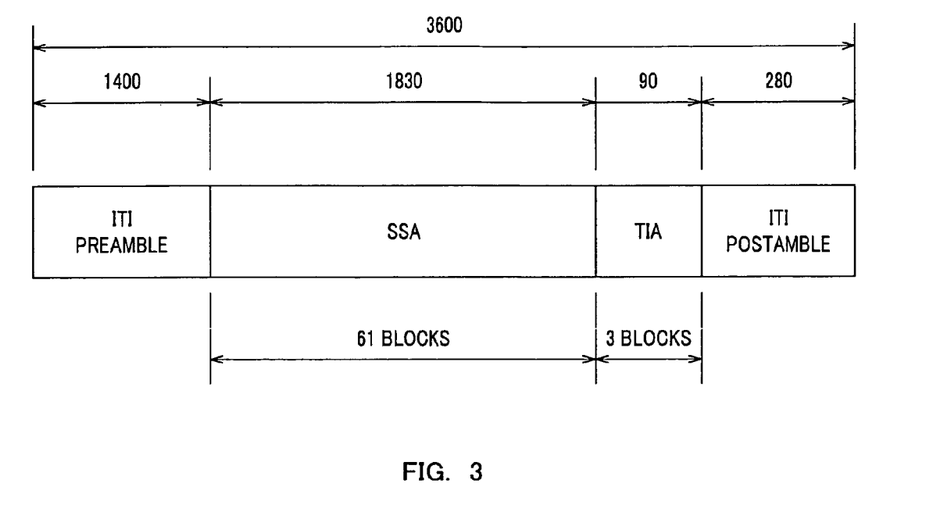
FIG. 3 is a view showing the configuration of ITI sector of the format according to the present invention.
Figure 4:
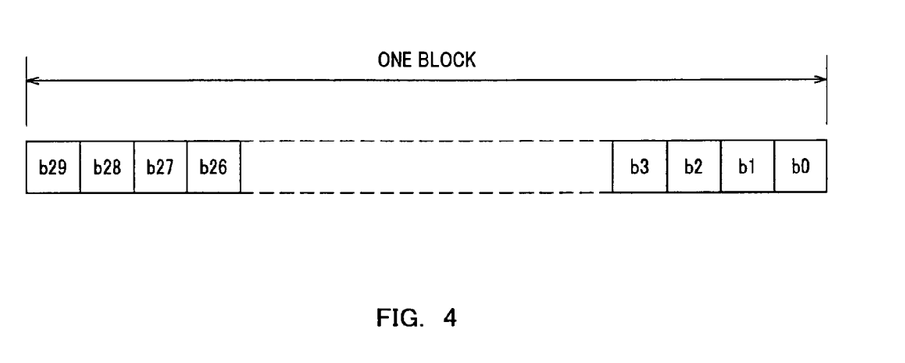
FIG. 4 is a view showing sync configuration of TIA of ITI sector of the format according to the present invention.

As shown in the FIG. 3, the configuration of the ITI sector of the format according to the present invention is the same as the DV format, and consists of ITI preamble (hereinafter referred to as preamble) of 1400 bits, SSA (Start-Sync block Area) of 1830 bits in total corresponding to 61 sync blocks with 30 bits being as one sync block unit, TIA (Track Information Area) of 90 bits in total corresponding to three sync blocks similarly with 30 bits being as one sync block unit, and ITI postamble of 280 bits. As shown in FIG. 4, the TIA is caused to be of sync structure of 30 bits (b0 to b29).

Figure 5:
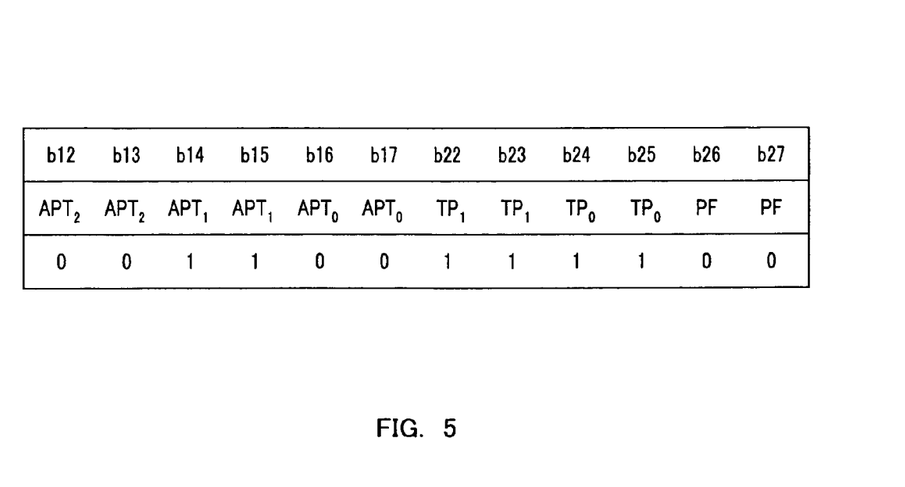
FIG. 5 is a view showing APT arrangement of the TIA shown in FIG. 4

Moreover, as shown in FIG. 5, the ITA is adapted so that APT (Application ID of a track) of three bits, TP (Track Pitch) of two bits and PF (Pilot Frame) of one bit are respectively double-recorded. Namely, values of APT are recorded within six bits from bit 12 to bit 17 of the TIA.

In the present invention, the APT of the ITI sector is caused to be "010". This is because the configurations of the Main sector and Subcode sector succeeding to the ITI sector are different from those of the DV format, and "001" is already used by other format.

Figure 6:
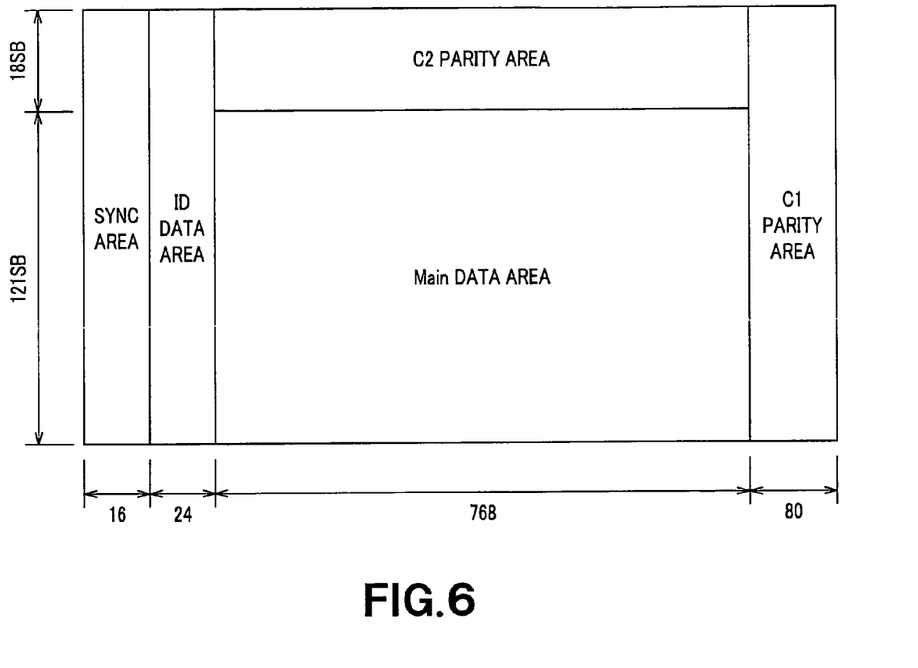
FIG. 6 is a view showing the configuration of Main sector of the format according to the present invention.

The Main sector is caused to be of the structure shown in FIG. 6. At the Main sector, there are recorded video data, audio data, additional data and search data. The Main sector consists of sync area of 16 bits, ID data area of 24 bits, C2 parity area and Main data area of 768 bits, and C1 parity area of 80 bits, wherein 139 sync blocks are recorded per one track. In this example, 18 sync blocks are recorded per one track in the C2 parity area, and 121 sync blocks are recorded per one track in the Main data area. In addition, values shown in FIG. 6 are values before 24-25 conversion is performed at 24-25 converting unit 11 which will be described later by using FIG. 13.

As shown in FIG. 1, the structure of the Subcode sector of the DV format consists of preamble of 1200 bits, Subcode data of 1200 bits, and postamble of 1325 bits at the time of 60 Hz or 1200 bits at the time of 50 Hz. Moreover, the area from the leading address of the ITI sector up to the leading address of the Subcode data of the Subcode sector is 132450 bits.

Figure 2:
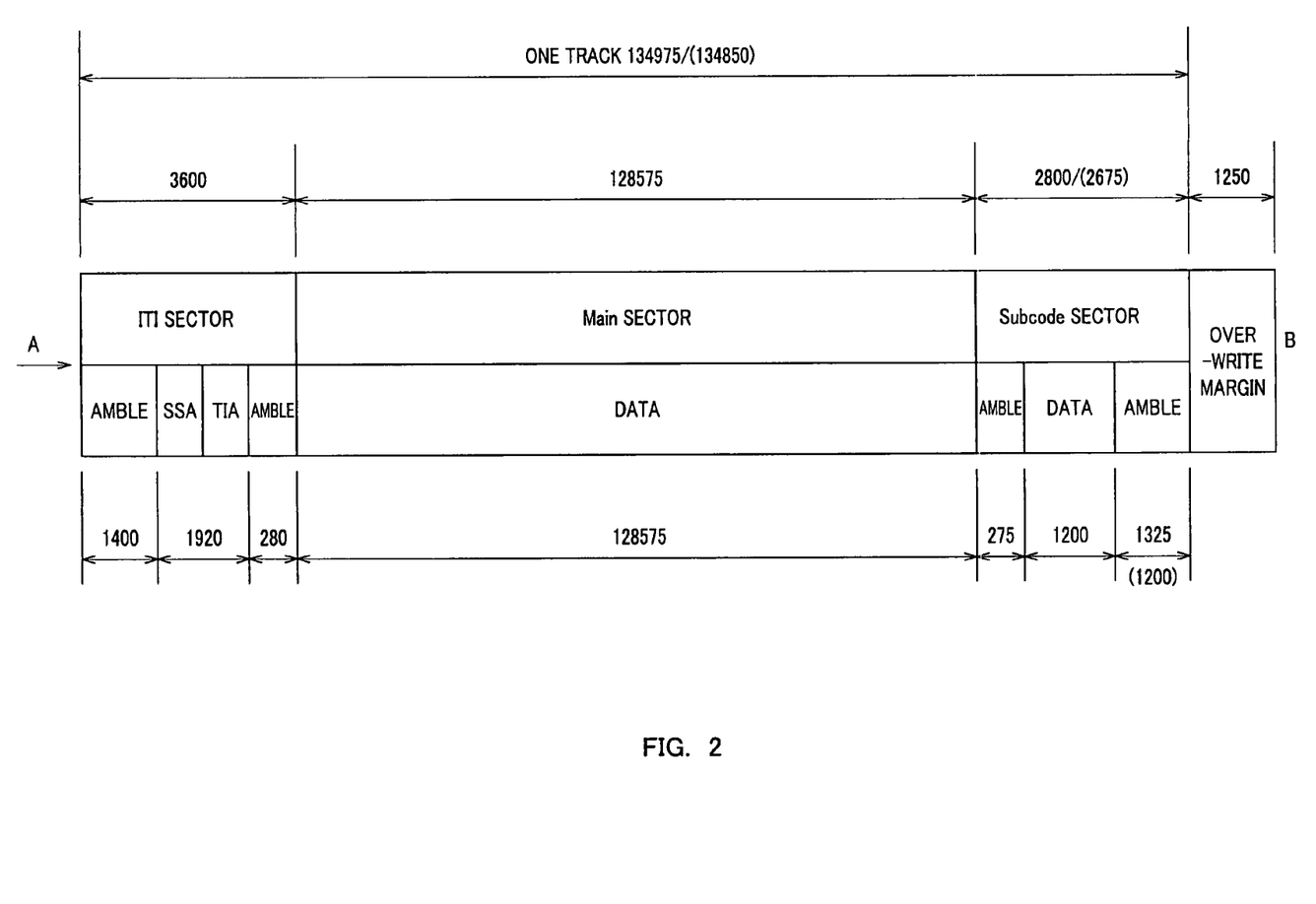
FIG. 2 is a view showing sector arrangement within track of a format according to the present invention.

On the other hand, as shown in FIG. 2, the structure of the Subcode sector of the present invention consists of preamble of 275 bits, Subcode data of 1200 bits and postamble of 1325 bits at the time of 60 Hz or 1200 bits at the time of 50 Hz. Moreover, the area from the leading address of the ITI sector up to the leading address of the Subcode data of the Subcode sector is 132450 bits similarly to the DV format.

In the case where there is employed a mechanism such that when Subcode sync pattern is detected by, e.g., reproducing unit which is in conformity with only the DV format (hereinafter referred to as DV reproducing unit), a specific position on a magnetic tape where Subcode sync blocks of the DV format are recorded with recording position (leading address) of the ITI sector being as reference is measured to limit the measured position to thereby detect Subcode sync pattern, the operation in the case where data recorded in accordance with the format according to the present invention is reproduced will be explained below.

In the DV reproducing unit, there is generally employed such a configuration that when sync patterns intermittently appear, that intermittent portions are interpolated. Here, interpolation processing by the DV reproducing unit will be explained. The DV reproducing unit is operative so that when no sync pattern appears at the subsequent timing (T1) after one sync pattern is detected, the DV reproducing unit forms, by interpolation, sync pulses in a pseudo manner at that T1 to further confirm whether or not sync pulse exsists at the subsequent timing (T2). Further, when sync pulse does not appear at T2, the DV reproducing unit has recognized that sync pulse does not exist to cur off continuity of a series of sync patterns to stand by detection of new sync pattern.

In the format according to the present invention, as shown in FIG. 2, the preamble of the Subcode sector is prepared by 275 bits. Since the preamble is twice (two sync blocks) or more greater than one sync block length (100 bits) of the Subcode, even if the interpolation circuit of the DV reproducing unit performs forward interpolation corresponding to two syncs, run-up pattern (bit train of a predetermined pattern different from sync pattern) is recorded in the vicinity of interpolated sync pulse, so there is extremely low possibility that pseudo data may be generated.

As stated above, since recording position of the Subcode sync block recorded by the DV format and recording position of the Subcode sync block recorded by the format according to the present invention are physically in correspondence with each other on the magnetic tape, there is no possibility that the detection range of the Subcode sync pattern may be mistaken in reproducing data which have been recorded by the format according to the present invention by means of the DV reproducing unit. It is to be noted that the preamble is only required to have the number of bits sufficient to cut off the continuity by interpolation processing of the DV reproducing unit, and is not limited to 275 bits. However, the area from the leading address of the ITI sector up to the leading address of the Subcode data of the Subcode sector must have 132450 bits similarly to the DV format.

Figure 7:
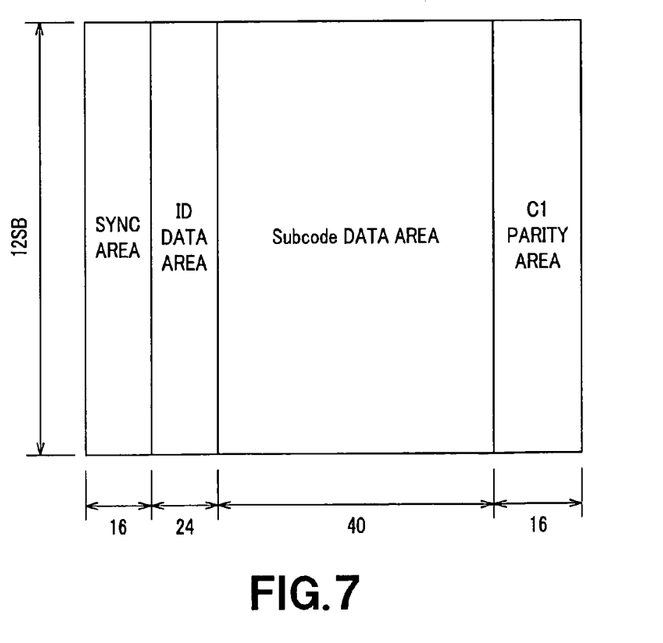
FIG. 7 is a view showing the configuration of Subcode data of the format according to the present invention.

Then, the structure of the Subcode data is shown in FIG. 7. One sync block consists of sync area of 16 bits; ID data area of 24 bits, Subcode data area of 40 bits, and C1 parity area of 16 bits, wherein 12 sync blocks are recorded per one track.

Figure 8:
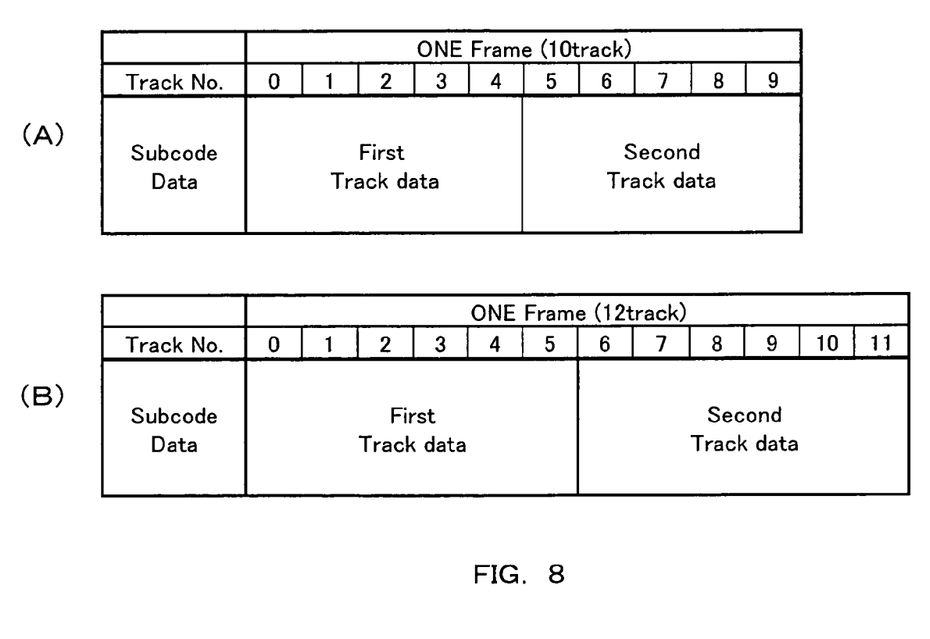
FIG. 8 is a view showing the configuration of Subcode data area of the Subcode data shown in FIG. 7.

Moreover, the structute of Subcode data area at the time of 60 Hz and 50 Hz is shown in FIG. 8. In the Subcode data area, in the case of 60 Hz, as indicated by (A) of FIG. 8, the first half five tracks from the track 0 up to the track 4 of one frame (10 tracks) is caused to be First Track Data (hereinafter referred to as first half data), and the latter half five tracks from the track 5 up to the track 9 is caused to be Second Track Data (hereinafter referred to as the latter half data). Further, in the Subcode data area, in the case of 50 Hz, as indicated by (B) of FIG. 8, the first half six tracks from the track 0 up to the track 5 of one frame (12 tracks) is caused to be the first half data, and the latter half six tracks from the track 6 up to the track 11 is caused to be latter half data. The first half data is as shown in FIG. 9A, and the latter half data is as shown in FIG. 9B.

Figure 9A:
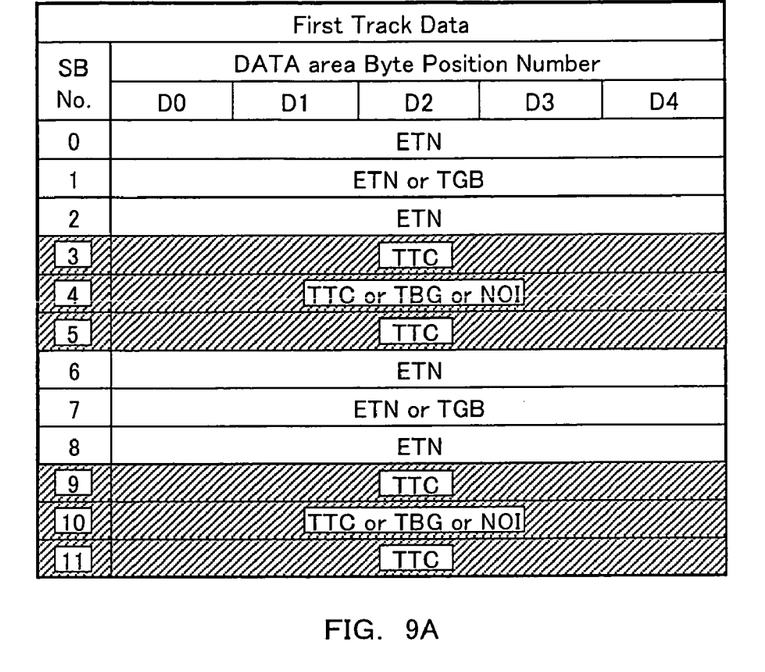
FIG. 9A is a view showing the configuration of First Track Data (first half data) of Subcode data area of the Subcode data shown in FIG. 7.
Figure 9B:
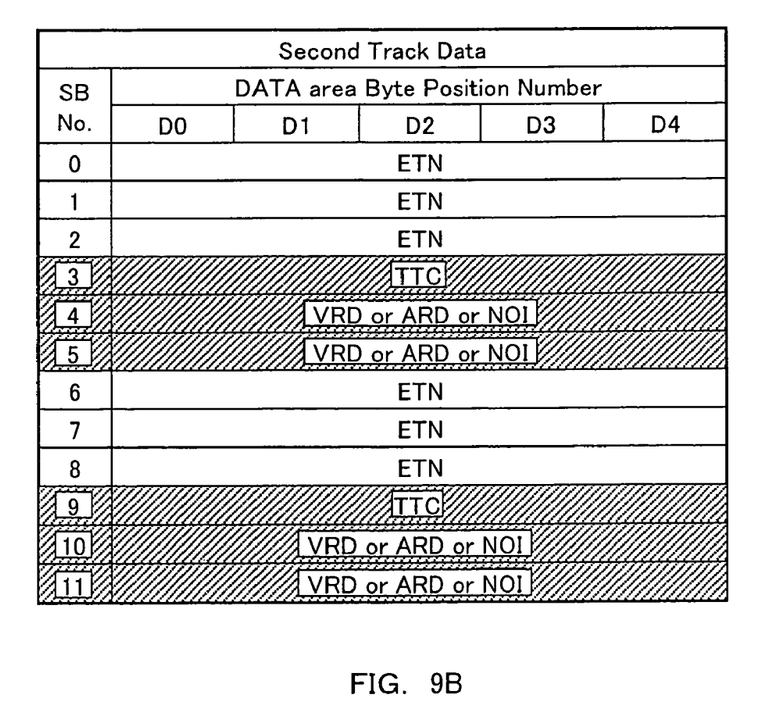
FIG. 9B is a view showing the configuration of Second Track Data (latter half data) of Subcode data area of the Subcode data shown in FIG. 7.

Sync blocks represented by slanting lines in FIGS. 9A and 9B are defined as Main area in the DV format, and are data areas in which designated data must be necessarily recorded. On the other hand, sync blocks to which slanting lines are not applied are defined as Option area, and are areas where operation (use) is free to some degree. In the present invention, ordinary recording in conformity with the DV format is performed into the Main area, and information accompanying with data to be recorded into the Main sector is recorded into the Option area. Moreover, as a matter of course, information recorded into the Option area employs five byte pack structure which is the same as that of the DV format. Further, in FIGS. 9A and 9B, the ETN indicates Extended Track Number pack and is located at the position of 97h from the pack header, the TTC indicates Title Time Code pack and is located at the position of 13h from the pack header, TBG indicates Title Binary Group pack and is located at the position of 14h from the pack header, NOI indicates No Info pack and is located at the position of FFh from the pack header, VRT indicates Vaux Rec Time pack and is located at the position of 62h from the pack header, VRT indicates Vaux Rec Time pack and is located at the position of 63h from the pack header, ARD indicates Aaux Rec Date pack and is loacated at the position of 52h from the pack header, and ART indicates Aaux Rec Time pack and is located at the position of 53h from the pack header.

Figure 10:
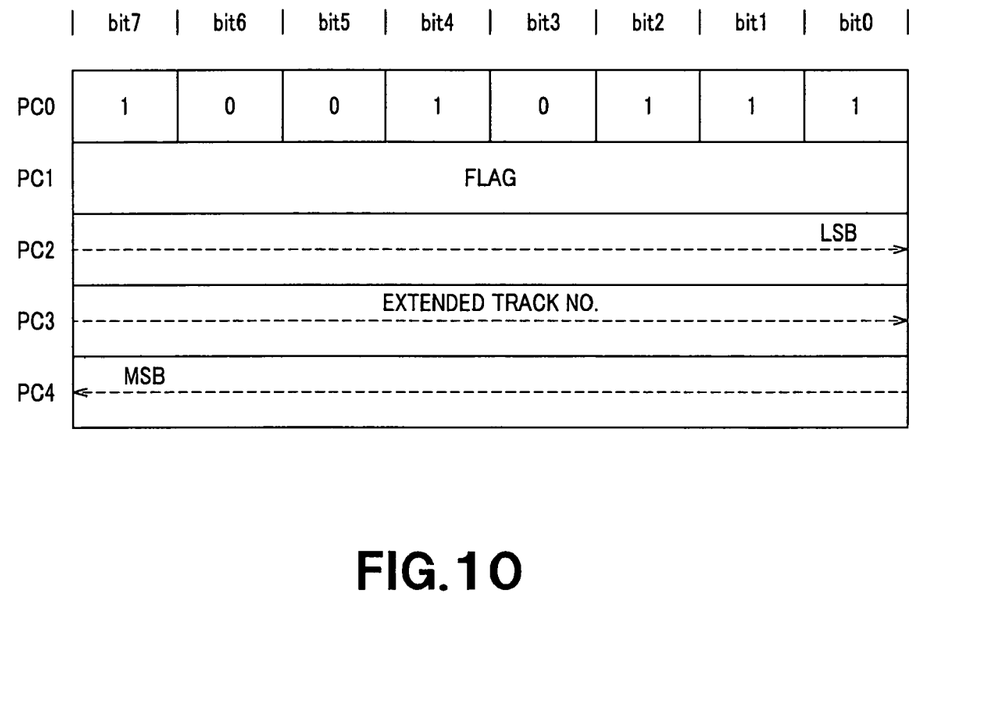
FIG. 10 is a view showing pack structure of extended track number (ETN).

An example of pack data is shown in FIG. 10. This pack data is caused to be of five byte pack structure, and consists of flag or the like, and Extended Track Number (ETN). It is to be noted that the detail of ETN recorded into PC2 to PC4 will be described later.

As the flag or the like recorded into PC1, there is recorded flag or the like relating to search data in the case where, e.g., video data encoded by MPEG-2 and search data prepared from the video data are recorded in the Main sector. Moreover, since Subcode sync block can be acquired even in the case where the recording/reproducing head included within the unit scans the tape at a high speed, flag indicating recording end point and/or kind of picture recorded on a current track may be recorded in the PC1.

Moreover, pack header of the pack data may be set to value which is not used in the DV format, e.g., 97h, etc. It is to be noted that when pack header is set to 97h, etc. in this way, compatibility with pack data group (9*h) relating to the MPEG of the DV format is improved.

Figure 11:
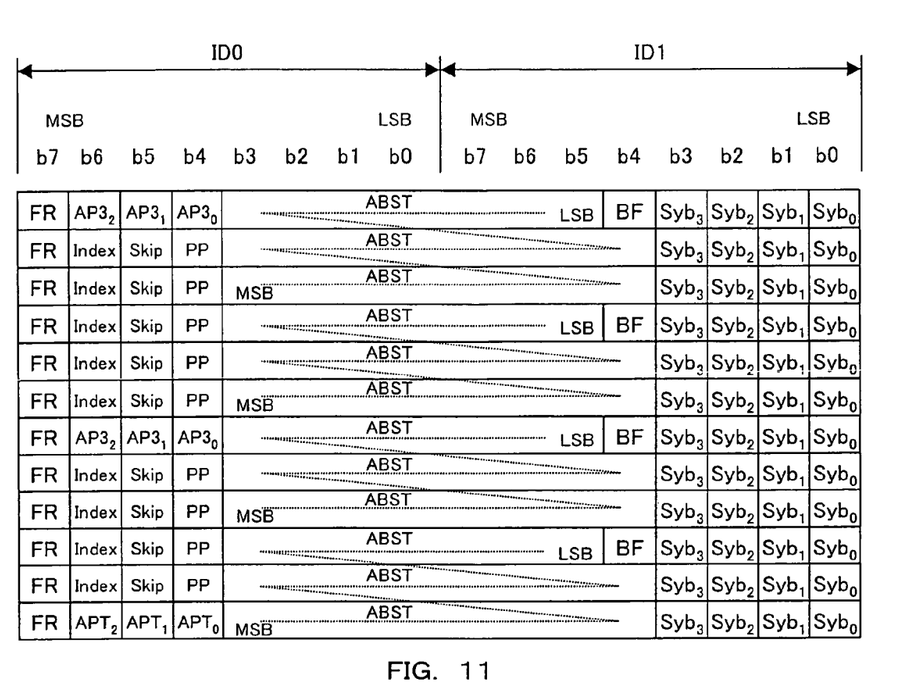
FIG. 11 is a view showing the configuration of ID data area of Subcode data of Subcode sector in the DV format.

Further, as shown in FIG. 11, the ID data area of Subcode data of Subcode sector in the DV format consists of ID0 (eight bits from MSB to LSB), ID1 (eight bits from MSB to LSB), and 24 bits of parity (eight bits) which is not shown. Further, at APT2 to APT0 of the 12-th sync of the ID data area (from bit 4 (b4) to bit 6 (b6) of ID0)), kinds of data recorded on tracks (Audio sector and Video sector) are represented. For example, "000" of the value of "APT2, APT1, APT0" (hereinafter referred to as APT) means that data of the consumer digital video cassette recorder are recorded on tracks, i.e., data of the DV format are recorded.

Figure 12:
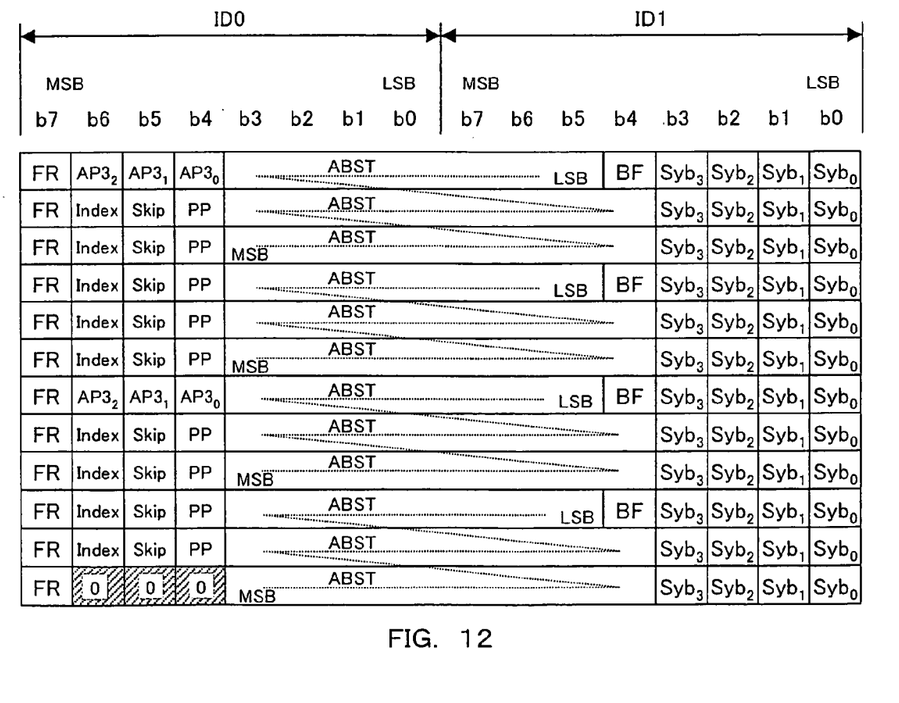
FIG. 12 is a view showing the configuration of ID data area of Subcode data of the subcode sector in the format according to the present invention.

On the other hand, similarly to the above-described DV format, as shown in FIG. 12, the ID data area of Subcode data of Subcode sector in the format according to the present invention consists of ID0 (eight bits from MSB to LSB), ID1 (eight bits from MSB to LSB) and 24 bits of parity (eight bits) which is not shown.

Here, APT2, APT1, APT0 of ITI in the DV format (hereinafter referred to as APT) and APT of Subcode data area of Subcode sector will be explained below.

In the case where data are recorded in accordance with the DV format, format information when such data are recorded into Audio sector and Video sector are recorded into APT of ITI and APT of Subcode data area of Subcode sector. For example, in the case where data are recorded by second format except for the DV format, information indicating the second format (except for "000") is recorded into APT of the ITI and APT of the Subcode data area of Subcode sector.

When the tape on which information indicating the second format is recorded in the APT of the ITI and the APT of the Subcode data area of Subcode sector in a manner as stated above is reproduced by the DV reproducing unit, corresponding track recording pattern may be track recording pattern different from the DV format (APT=000). As a result, there are instances where even if Subcode data can be acquired in the state of no error, there results as if such tape behaves as non-recorded tape so that there are instances where previously recorded data may be erroneously erased, or may be overwrite-recorded by other data.

Here, APT of ITI and APT of Subcode data area of Subcode sector in the format according to the present invention will be described below.

In the case where data is recorded in accordance with the format according to the present invention, format information when such data is recorded in the Main sector is recorded into APT of ITI, and information "000" indicating DV format is recorded into APT of Subcode data area of Subcode sector. Accordingly, in the present invention, predetermined values are recorded into APT of ITI on the basis of data recorded in the Main sector, but information indicating the DV format is fixedly recorded at APT of Subcode data area of the Subcode sector. For example, in the case where data are recorded into the Main sector by the format except for the DV format, "010" is recorded in APT of IT1, and "000" is recorded at the APT of Subcode data area of the Subcode sector.

Accordingly, when data are recorded in accordance with the format according to the present invention, format information of data to be recorded into the Main sector is recorded, in a manner as in the case of the prior art, into APT of ITI. However, since information indicating DV format is recorded into APT of Subcode data area of Subcode sector, in the case where such data are reproduced by the DV reproducing unit, data which has been recorded into the Main sector can be recognized as data which has been recorded in accordance with the DV format.

Here, a practical example of a magnetic tape recording/reproducing apparatus 1 adapted for recording data in accordance with the above-described format will be shown below.

Figure 13:
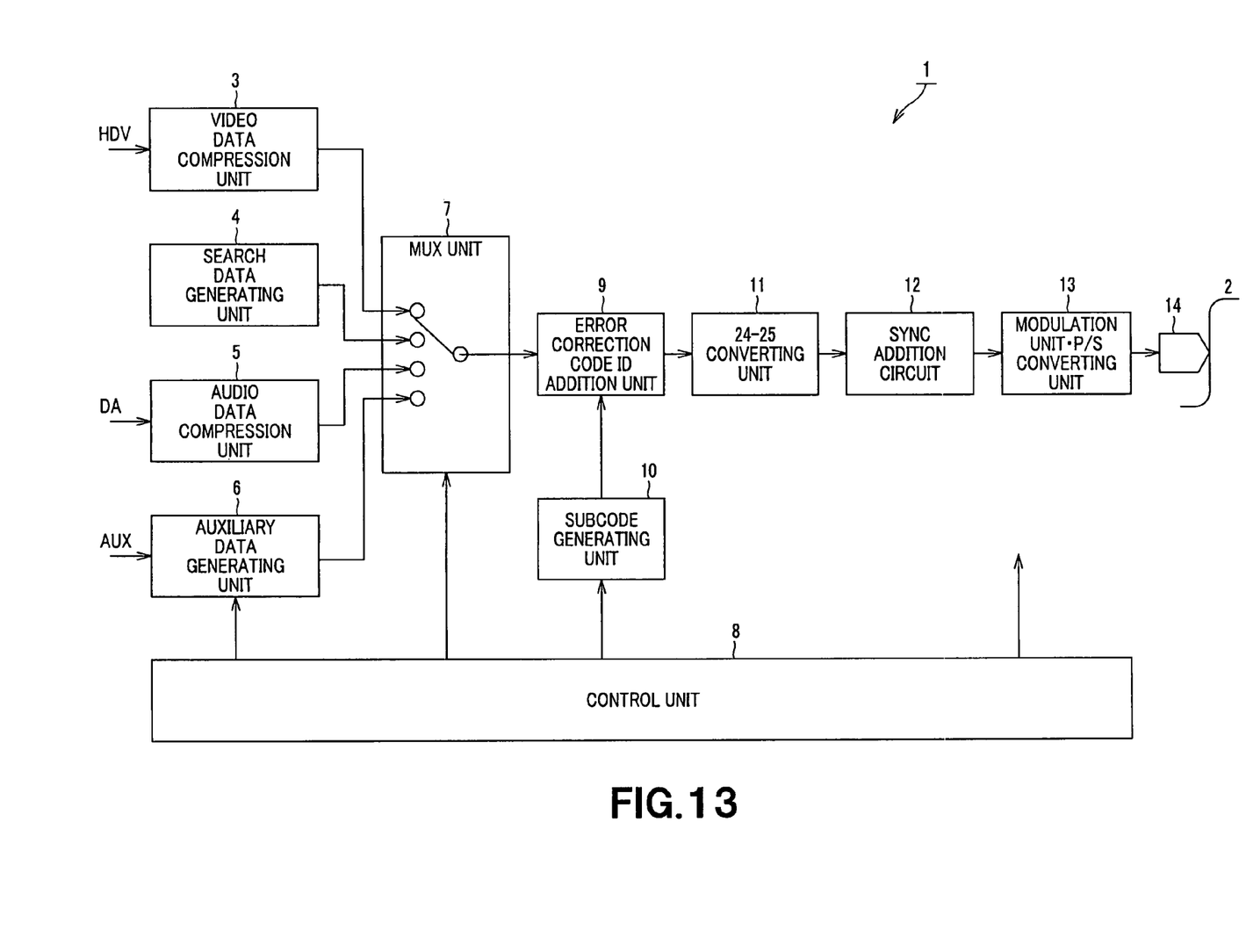
FIG. 13 is a block diagram of recording system of a magnetic tape recording/reproducing apparatus employing the format according to the present invention.

FIG. 13 is a block diagram of the recording system of the magnetic tape recording/reproducing apparatus 1. The magnetic tape recording/reproducing apparatus 1 comprises a video data compression unit 3 for performing compression processing of inputted video data, a search data generating unit 4 for generating search data, an audio data compression unit 5 for performing compression processing of inputted audio data, an auxiliary data generating unit 6 for generating auxiliary data, a MUX unit 7 for performing multiplex processing of data inputted from the video data compression unit 3, the search data generating unit 4, the audio data compression data 5 and the auxiliary data generating unit 6, an error correction code ID addition unit 9 for adding error correction code and ID data, a subcode generating unit 10 for generating data train of subcode in the Subcode sector, a 24-25 converting unit 11 for performing 24-25 conversion with respect to data inputted from the error correction code ID addition unit 9, a sync addition circuit 12 for adding sync to inputted data, a modulation unit·P/S converting unit 13 for implementing NRZI (Non Return to Zero Inverted) modulation to the input data thereafter to convert it into data train, a control unit 8 for controlling the entirety of the operation of the magnetic tape recording/reproducing apparatus 1, and a magnetic head 14 for recording, onto converting unit 13.

Here, the operation for recording data onto the magnetic tape 2 by the magnetic tape recording/reproducing apparatus 1 will be explained.

Video data HDV (High Definition Video) inputted in sequence are compressed into MPEG-2 video ES (Elementary Stream) at the video data compressing unit 3 which has been rate-controlled by the control unit 8. Further, PES header consisting of DTS (Decoding Time Stamp) which is decode time information and PTS (Presentation Time Stamp) which is display time information, etc. is added to the compressed video data thus obtained so that they are changed into PES (Packetized Elementary Stream). Thereafter, the PES thus obtained is stored into a predetermined position of the memory of the MUX unit 7.

Moreover, audio data DA are compressed into MPEG-1 Audio Layer 2 at the audio data compression unit 5. PES headers are added to the compressed audio data thus obtained similarly to the video PES so that they are changed into PES. Thereafter, the PES thus obtained is stored at a predetermined position of the memory of the MUX unit 7.

The search data generating unit 4 selectively acquires picture data which is I picture among video PES data which have been temporarily stored in the MUX unit 7 to further perform data compression thereof to thereby generate search picture to change the search picture thus generated into PES thereafter to store it at a predetermined position of the memory of the MUX unit 7.

The auxiliary data generating unit 6 collects information accompanying with compression of video data and audio data, information relating to search data and time information relating to those information from the video data compression unit 3, the audio data compression unit 5 and the search data generating unit 4, and is supplied with information for controlling those information thus collected from the control unit 8 to generate auxiliary data on the basis of the delivered information to store it at a predetermined position of the memory of the MUX unit 7. Various data stored in the memory of the MUX unit 7 are read out from predetermined memory positions at predetermined times in accordance with ETN monotonously increasing in track units which have the relationship proportional to DTS of the video PES data. Error correction code and ID data are added to the data thus read out at the error correction code ID addition unit 9. Thereafter, the data thus obtained are 24-25 converted at the 24-25 converting unit 11, and sync patterns are added, by the sync addition circuit 12, to the leading portions every sync blocks of the data which have been 24-25 converted. The data thus obtained are NPZI-modulated by the modulation unit·P/S converting unit 13. Thereafter, the modulated data thus obtained are converted into serial data train. The serial data train thus obtained is recorded onto the magnetic tape 2 by the recording amplifier & magnetic recording head 14. In this example, ETN which is timing information for reading out data in the memory of the MUX unit 7 is also recorded onto the magnetic tape 2 as a portion of subcode data.

Then, the operation when data recorded onto the magnetic tape 2 as described above is reproduced by the magnetic tape recording/reproducing apparatus 1 will be explained.

Figure 14:
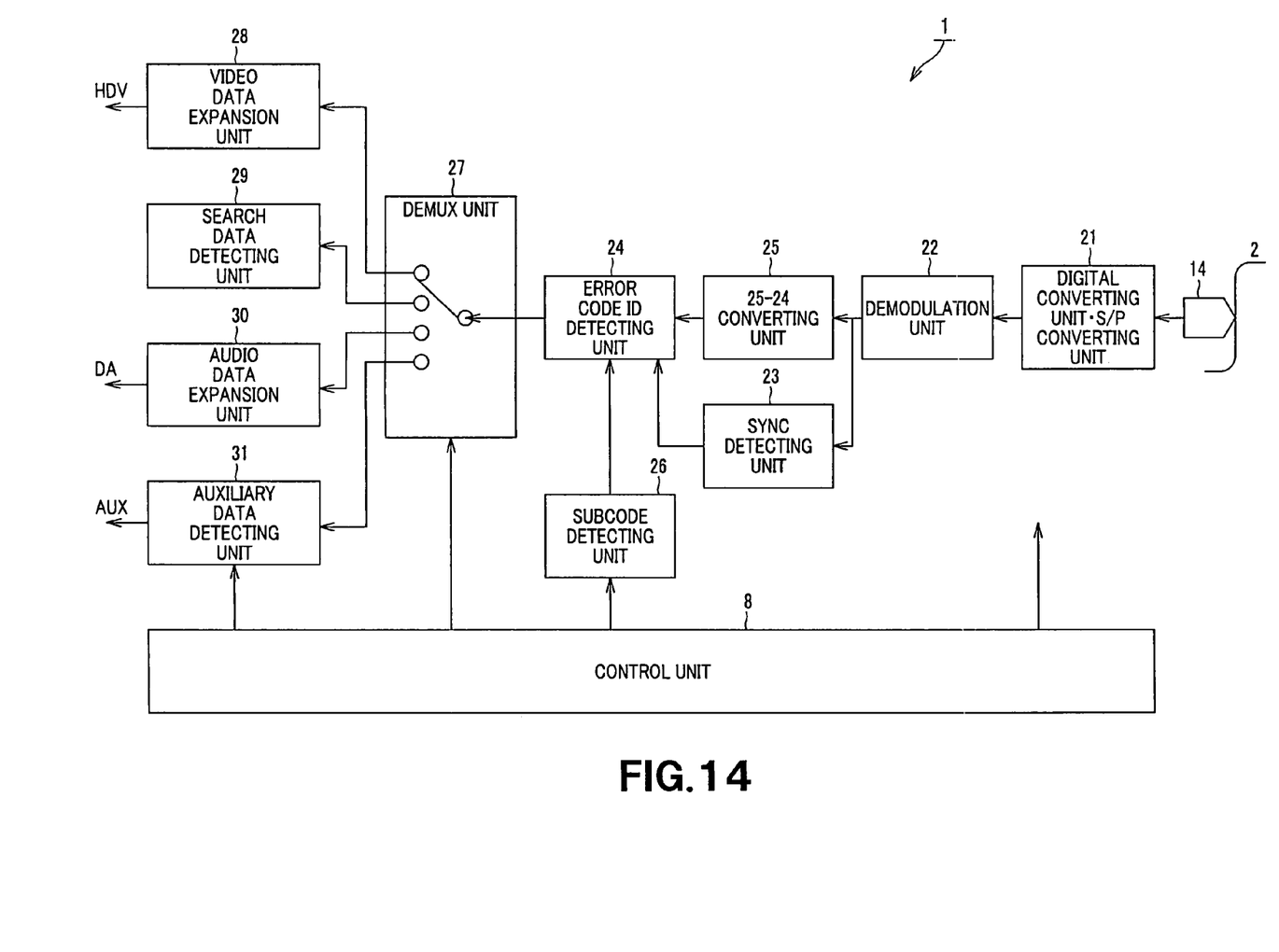
FIG. 14 is a block diagram of reproducing system of the magnetic tape recording/reproducing apparatus employing the format according to the present invention.

FIG. 14 is a block diagram of the reproducing system of the magnetic tape recording/reproducing apparatus 1. The magnetic tape recording/reproducing apparatus 1 comprises magnetic head 14 for reading out data from the magnetic tape 2, a digital converting unit·S/P converting unit 21 for performing digital conversion and serial-to-parallel conversion, a demodulation unit 22 for performing demodulation processing, a sync detecting unit 23 for detecting the leading portion of sync, an error code ID detecting unit 24 for performing error correction processing and deinterleave processing, a 25-24 converting unit 25 for performing 25-24 conversion with respect to inputted data, a subcode detecting unit 26 for performing sync block detection of subcode from subcode sync to perform error correction, a DEMUX unit 27 for separating output data of the error code ID detecting unit 24 into data of respective processing systems by sync block header to output data thus separated, a video data expansion unit 28 for performing data expansion of video data inputted from the DEMUX unit 27 to output data thus obtained, a search data detecting unit 29 for generating video data from data for search inputted from the DEMUX unit 27 to output the video data thus generated, an audio data expansion unit 30 for performing data expansion of audio data inputted from the DEMUX unit 27 to output the audio data thus obtained, and an auxiliary data detecting unit 31 for detecting auxiliary data inputted from the DEMUX unit 27 to output the auxiliary data thus detected to the control unit 8.

It is to be noted that the digital converting unit·S/P converting unit 21 and demodulation unit 22 and the modulation unit·P/S converting unit 13, the 25-24 converting unit and the 24-25 converting unit 11, the error code ID detecting unit 24 and the error correction code ID addition unit 9, the subcode detecting unit 26 and the subcode generating unit 10, the DEMUX unit 27 and the MUX unit 7, the video data expansion unit 28 and the video data compression unit 3, the search data detecting unit 29 and the search data generating unit 4, the audio data expansion unit 30 and the audio data compression unit 5, and the auxiliary data detecting unit 31 and the auxiliary data generating unit 6 may be integrated.

Here, the operation for reading out data recorded on the magnetic tape 2 by the magnetic tape recording/reproducing apparatus 1 will be explained.

Data reproduced by the magnetic head 14 is S/P converted at the digital converting unit·S/P converting unit 21. Thereafter, demodulation with respect to NRZI modulation at the time of recording is performed at the demodulation unit 22, and 25-24 conversion is performed at the 25-24 converting unit 25. The 25-24 converting unit 25 outputs, to the error code ID detecting unit 24, data which is the same as data when it is inputted to the 24-25 converting unit 11. Moreover, at the same time, data demodulated at the demodulation unit 22 is inputted to the sync detecting unit 23. The sync detecting unit 23 detects the leading portion of sync from input bit train to output detection result to the error code ID detecting unit 24.

Error correction of reproduction data after 25-24 conversion is performed by the 25-24 converting unit 25 is performed by the error code ID detecting unit 24. Thereafter, the data thus obtained is stored at a predetermined position of the memory of the DEMUX unit 27.

The DEMUX unit 27 reads out subcode information to the control unit 8 at a predetermined timing via the subcode detecting unit 26. The control unit 8 performs initialization of STC (System Time Clock) which provides basis of timings for reading out respective data from the memory with the ETN recorded in the subcode being as reference. Moreover, the DEMUX unit 27 selects output destination on the basis of identification information within the sync block in accordance with control of the control unit 8, and performs comparison processing between DTS and STC which are written in respective PES headers of video data and audio data. In the case where the DEMUX unit 27 has judged on the basis of the comparison result that STC coincides with time of DTS-VBV (Video Buffering Verifier) delay, it outputs, to the video data expansion unit 28, video PES data in which that DTS is written in the PES header.

The video PES data inputted to the video data expansion unit 28 is expanded so that it is outputted as original video data HDV. When audio data STC coincides with time corresponding to delay necessary for checking PTS-PES data length, the DEMUX unit 27 outputs, to the audio data expansion unit 30, audio PES data in which that PTS is written in the PES header. The audio PES data inputted to the audio data expansion unit 30 is expanded so that it is outputted as original audio data DA.

With respect to search data which has been read out from the memory of the DEMUX unit 27, video data is detected by the search data detecting unit 29, and is outputted as video data HDV via the video data expansion unit 28.

The auxiliary data which has been read out from the memory of the DEMUX unit 27 is passed through the auxiliary data detecting unit 31 so that it is respectively discriminated as information relating to expansion of video data or audio data, and auxiliary data with respect to search data. A portion of the discriminated information is delivered to the control unit 8, and is outputted to the external as AUX.

Here, the relationship between recording position of the video PES data and ETN will be described below. The relationship between recording position of video PES data recorded on the magnetic tape by the present invention and ETN is equal to the relationship between video PES data and DTS time. The time difference between the leading address of the video PES data and the DTS time is VBV delay. In this case, the number of tracks from the leading position of specified video PES data on the magnetic tape up to track where ETN corresponding to that video PES data is recorded at subcode can be calculated as follows.

VBV delay/90 kHz×(video encode rate)/(valid data quantity which can be recorded within one track)

Quotient of this calculation result becomes the number of tracks, and the remainder becomes recording position correction quantity of sync block unit which has accuracy finer than track.

For example, in the case where specific ETN is recorded at the subcode of a certain track on the magnetic tape, write position of video PES data corresponding to that ETN is position from specific sync block of a track ahead by one with respect to track traced back by the number of tracks corresponding to VBV delay from track of ETN as previously described. However, as data to be actually recorded onto the magnetic tape, there are not only video data, but also audio PES data, search data and/or auxiliary data. For this reason, in the magnetic tape recording/reproducing apparatus 1, in order to have margin therefor, recording of video PES data, audio PES data, auxiliary data and/or search data is started from track traced back by VBV delay+α track (e.g., α=16) from track of ETN.

Moreover, if data corresponding to valid data quantity which can be recorded within the previously described one track is reproduced with fidelity per one track at the time of reproduction, video PES data results in exactly the same as data by itself when recorded. Thus, it becomes possible to reproduce and output such data as stream in which there is no deviation in data quantity per unit time.

Further, in the process for determining position at which recording of data is started on a magnetic tape, when there exist plural tracks where specific ETN is recorded, inconvenience in which track where recording of video PES data is started cannot be determined into one track may take place. Moreover, the relationship between ETN and track where recording of video PES data is started is the same as the relationship between DTS and the leading portion of video PES data. When the interval between value of ETN corresponding to certain video PES data and value of ETN corresponding to the subsequent video PES data is not equal at all times with respect to the fact that DTS equidistantly increases at video one frame interval, contradiction would necessarily take place as deviation of data quantity per unit time at the time of reproduction.

Moreover, in the DV format, ATN (Absolute Track Number) for counting the number of absolute tracks exists at subcode. In this case, in order to take, into consideration, mixed recording of SP (Standard Play) recording mode where tape traveling speed is standard speed and LP (Long Play) recording mode where tape traveling speed is two-thirds times greater than that of the SP recording mode are mixed, and/or connecting (linking) photographic recording, there results such an operation as a counter which increments by one per each track in the SP recording mode, whereas there results such an operation as a counter which increments by two counts per three tracks at the time of LP recording mode. For this reason, the DV format cannot be utilized as a track counter which increments one count per one track in any case like the above-described ETN. In view of the above, in the format according to the present invention, the above-described ETN is utilized as a counter which increments by one count per one track.

In the magnetic tape recording/reproducing apparatus 1 constituted as stated above, in recording, e.g., HD video data onto a magnetic tape in conformity with the DV format, compression processing of the HD video data is performed, and the compressed HD video data is recorded onto the magnetic tape in accordance with second format different from the DV format. Accordingly, information indicating the second format is recorded into APT of ITI, information indicating DV format is recorded into the APT of the Subcode data area of the Subcode sector, and the recording start position of Subcode data of the Subcode sector becomes equal to the recording start position of Subcode data of Subcode sector when data are recorded in accordance with the DV format. Accordingly, in reproducing DV tape on which data have been recorded in accordance with the format according to the present invention by the magnetic tape recording/reproducing apparatus 1, the DV reproducing unit (reproducing unit in conformity with only the DV format) becomes operative so as to evaluate APT of ITI, whereby when it is recognized that recording has been made with respect to the DV tape in accordance with the format except for the DV format, it reads out time code, etc. recorded at Subcode data of the Subcode sector without reading data recorded in the Main sector to display the time code, etc. on a display. User can recognize by time code, etc. displayed on the display that other data has been already recorded in the Main sector. Thus, attention can be paid to user such that he does not intend to erroneously erase data recorded in the Main sector, or overwrite-record such data by other data.

In addition, user who uses the DV reproducing unit may be caused to execute a predetermined operation for performing judgment as to whether or not corresponding tape is non-recorded tape (e.g., Cur/Review operation) by, e.g., instruction manual, etc. The DV reproducing unit performs Cue/Review operation to thereby conduct an operation so as to skip ITI sector in reading to read out only data (time code, etc.) recorded at Subcode data of Subcode sector to display the time code, etc. on the display. User can recognize by time code, etc. displayed on the display that other data has been already recorded in the Main sector. Thus, attention can be paid to user such that he does not intend to erroneously erase data recorded in the Main sector, or overwrite-record such data by other data.

It is to be noted that while the invention has been described in accordance with preferred embodiments thereof illustrated in the accompanying drawings and described in detail, it should be understood by those ordinarily skilled in the art that the invention is not limited to embodiments, but various modifications, alternative constructions or equivalents can be implemented without departing from the scope and spirit of the present invention as set forth by appended claims.

INDUSTRIAL APPLICABILITY

In the recording apparatus and the recording method according to the present invention, in recording, e.g., HD video data onto magnetic tape in conformity with the DV format, compression processing of the HD video data is performed to generate system data including at least time code to generate extended track number by a predetermined method on the basis of the HD video data to store the compressed HD video data and system data into memory unit to read out, from the memory unit, the compressed HD video data and the system data on the basis of the extended track number to record such data onto magnetic tape in accordance with the second format different from the DV format. Accordingly, information indicating the second format is recorded in the APT of ITI, information indicating DV format is recorded at APT of the Subcode data area of the Subcode sector, and the recording start position of Subcode data of the Subcode sector becomes equal to the recording start position of Subcode data of the Subcode sector when data have been recorded in accordance with the DV format.

Accordingly, in reproducing recording tape on which data have been recorded in accordance with the second format by the recording apparatus according to the present invention, the DV reproducing unit (reproducing unit in conformity with only the DV format) becomes operative so as to evaluate APT of ITI to recognize that recording has been made onto the magnetic tape in accordance with the second format to read out time code, etc. recoded in Subcode data of Subcode sector without reading data recorded in the Main sector to display the time code, etc. on display. User can recognize by time code, etc. displayed on the display that other data has been already recorded in the Main sector. Thus, attention can be said to user such that he does not intend to erroneously erase data recorded in the Main sector, or overwrite-record such data by other data.

The invention claimed is:

1. A recording apparatus adapted for recording first definition data in accordance with a first format, and for recording data having a second definition different from the first definition data in accordance with a second format different from the first format onto a magnetic tape in which plural tracks each consisting of first sector, second sector and third sector are formed in conformity with the first format, the recording apparatus comprising:
compressed data processing means for performing compression processing of inputted second definition data to generate compressed data;
system data generating means for generating system data including at least time code;
time management information generating means for detecting time information from the inputted second definition data to generate time management information on the basis of the time information;
extended track number generating means for generating extended track number on the basis of the time management information;
memory means for storing the compressed data and the system data;
read-out means for reading out compressed data and system data which are stored in the memory means;
control means for controlling the read-out means so as to read out, at a predetermined timing, the compressed data and the system data which are stored in the memory means on the basis of the extended track number; and
recording means for recording, into the second sector, the compressed data which has been read out by the read-out means, and for recording, into the third sector, along with extended track number, the system data which has been read out by the read-out means,
wherein the recording means records, at a predetermined position of the first sector, format information indicating that compressed data is recorded in the second sector in accordance with the second format, and records, at a predetermined position of the third sector-position in which format information indicating the first format is recorded in the case where data is recorded in accordance with the first format, position from the leading address of the first sector-format information indicating the first format.

2. The recording apparatus as set forth in claim 1, wherein the compression data processing means performs compression processing of inputted second definition data by the MP@HL system or the MP@H-14 system.

3. A recording method of recording first definition data in accordance with a first format, and of recording data having a second definition different from the first definition data in accordance with a second format different from the first format onto a magnetic tape in which plural tracks each consisting of first sector, second sector and third sector are formed in conformity with the first format, the recording method including:
a compressed data generation step of performing compression processing of inputted second definition data to generate compressed data;
a system data generation step of generating system data including at least time code;
a time management information generation step of detecting time information from inputted second definition data to generate time management information on the basis of the time information;
an extended track number generation step of generating an extended track number on the basis of the time management information;
a memory step of storing the compressed data and the system data into a memory unit;
a read-out step of reading out, at a predetermined timing, compressed data and system data from the memory unit on the basis of the extended track number; and
a recording step of recording, into the second sector, compressed data which has been read out by the read-out step, and of recording, into the third sector, along with extended track number, the system data which has been read out by the read-out step, wherein the recording step comprising: recording, at a predetermined position of the first sector, format information indicating that compressed data is recorded in the second sector in accordance with the second format, and recording, at a predetermined position of the third sector-position in which format information indicating first format is recorded in the case where data is recorded in accordance with the first format, position from the leading address of the first sector-format information indicating the first format.

4. A recording apparatus adapted for recording first definition data in accordance with a first format, and for recording data having a second definition different from the first definition data in accordance with a second format different from the first format onto a magnetic tape in which plural tracks each consisting of first sector, second sector and third sector are formed in conformity with the first format, the recording apparatus comprising:

a compressed data processing unit for performing compression processing of inputted second definition data to generate compressed data;

a system data generating unit for generating system data including at least time code;

a time management information generating unit for detecting time information from the inputted second definition data to generate time management information on the basis of the time information;

an extended track number generating unit for generating extended track number on the basis of the time management information;

a memory unit for storing the compressed data and the system data;

a read-out unit for reading out compressed data and system data which are stored in the memory unit;

a control unit for controlling the read-out unit so as to read out, at a predetermined timing, the compressed data and the system data which are stored in the memory unit on the basis of the extended track number; and a recording unit for recording, into the second sector, the compressed data which has been read out by the read-out unit, and for recording, into the third sector, along with extended track number, the system data which has been read out by the read-out unit, wherein the recording unit records, at a predetermined position of the first sector, format information indicating that compressed data is recorded in the second sector in accordance with the second format, and records, at a predetermined position of the third sector-position in which format information indicating the first format is recorded in the case where data is recorded in accordance with the first format, position from leading address of the first sector-format information indicating the first format.

5. The recording apparatus as set forth in claim 4, wherein the compressed data processing unit performs compression processing of inputted second definition data by the MP@HL system or the MP@H-14 system.

\* \* \* \* \*